No. 767,617. PATENTED AUG. 16, 1904.
J. W. J. WELLS.
EYEGLASSES.
APPLICATION FILED MAR. 4, 1904.
NO MODEL.
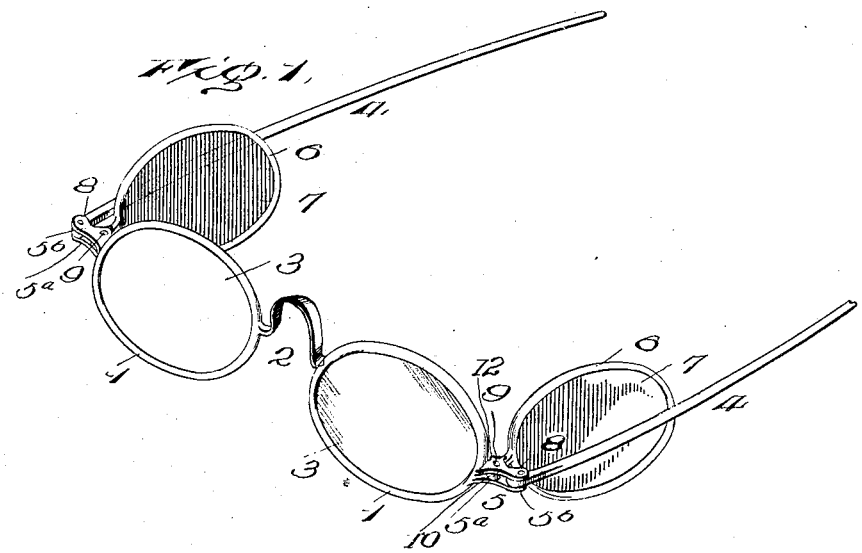
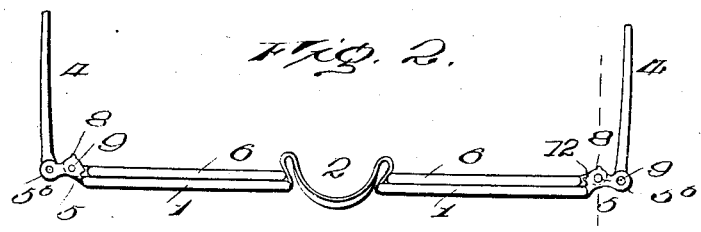
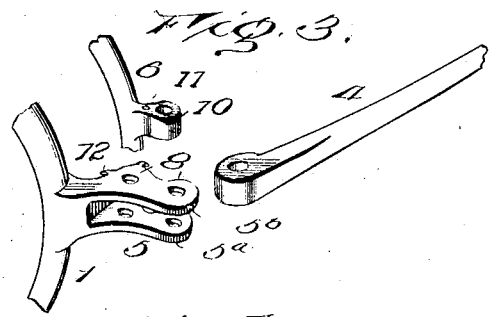
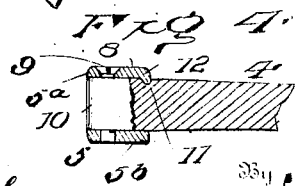
Witnesses
Inventor
John W. J. Wells.
Attorneys No. 767,617.

Patented August 16, 1904.

UNITED STATES PATENT OFFICE.

JOHN W. J. WELLS, OF MESO, ILLINOIS.

EYEGLASSES.

SPECIFICATION forming part of Letters Patent No. 767,617, dated August 16, 1904.

Application filed March 4, 1904. Serial No. 196,586. (No model.)

*To all whom it may concern:*

Be it known that I, JOHN W. J. WELLS, a citizen of the United States, residing at Meso, in the county of Jefferson and State of Illinois, have invented certain new and useful Improvements in Eyeglasses, of which the following is a specification.

The purpose of this invention is to provide a structure of eyeglasses or spectacles combining in a single article lenses of different focuses, whereby the same may be used for different purposes—for instance, for reading or long-distance uses.

The invention particularly relates to spectacles providing a pair of supplemental lenses movably mounted upon the frame of the spectacles, so as to be readily brought into use when desired.

For a full description of the invention and the merits thereof and also to acquire a knowledge of the details of construction of the means for effecting the result reference is to be had to the following description and accompanying drawings.

While the essential and characteristic features of the invention are susceptible of modification, still the preferred embodiment of the invention is illustrated in the accompanying drawings, in which—

Figure 1 is a perspective view showing the embodiment of the invention, the supplemental lenses being shown in the positions assumed thereby when out of use. Fig. 2 is a top plan view showing the relative position of the lenses when in use. Fig. 3 is a detail view, enlarged, showing more clearly the manner of mounting the supplemental eyeglass-lenses upon the frame of the spectacles. Fig. 4 is a vertical sectional view, partially broken away, showing the engaging action of the projections 12 of the studs 5.

Corresponding and like parts are referred to in the following description and indicated in all the views of the drawings by the same reference characters.

The spectacles shown in the drawings are of common type and comprise the frame, consisting of the bows 1, the connecting nose-piece 2, and the lenses 3, secured in the bows of said frame. The temples 4 are pivoted to the frame of the spectacles in the usual manner, said temples being carried by studs 5, projected from the end portions of the bows 1. The studs 5 are of peculiar formation, so as to support the supplemental bows 6, which carry the lenses 7, the latter being of a different focus from the lenses 3, mounted in the bows 1. It will be obvious that any character of lens 7 may be disposed within the supplemental bows 6 within the contemplation of my invention, and this feature would of course depend greatly upon the affection of the eyes of the wearer of the spectacles.

As before premised, the studs 5 are specially formed, being composed of spaced members $5^a$ and $5^b$. The members $5^a$ and $5^b$ of the studs 5 are enlarged between the ends thereof, as shown at 8, and the enlarged portions 8 are provided with openings to receive a screw or similar fastening 9, by which the supplemental bow 6 is pivotally mounted upon the stud. The temples 4 are pivotally secured between the outer end portions of the studs 5 by means of a screw-fastening or similar device also.

In order that the supplemental lenses may be disposed close against the main lenses 3 when the said supplemental lenses are in use, the studs 5 are deflected or curved from the plane of the frame of the spectacles. The form of the studs 5 thus admits of the disposal of the lenses 7 in the positions above mentioned.

When the lenses 7 are not in use, they are by a pivotal movement turned backward from the lenses 3 approximately in contact with the temples 4, as shown most clearly in Fig. 1 of the drawings. The use and operation of the spectacles or eyeglasses are obvious and need not be described in detail.

Because of the manner of mounting the supplemental bows 6 it is very desirable that some means be provided for positively holding the supplemental lenses adjacent the main lenses 3 or in the reverse position assumed by the supplemental lenses when not in use. For the above purpose the pivot member 10 of each supplemental bow 6, which is received between the spaced members $5^a$ and $5^b$ of the coöperating stud, has formed upon the upper side thereof a recess or depression 11. The uppermost spaced member $5^h$ of the stud 5 is provided with adjacent projections 12, which are adapted to spring into engagement with the recess or depression 11 of the pivot member 10 to positively lock the supplemental lens in either of the positions above set forth. The projections 12 have a spring action.

Having thus described the invention, what is claimed as new is—

1. In eyeglasses or spectacles, the combination of a frame composed of bows, studs projected from the bows and comprising spaced members, supplemental bows provided with pivot members projected therefrom and pivoted between the spaced members of the studs aforesaid, said pivot members of the supplemental bows being provided with a depression or recess, and independent spring projections integrally formed with one of the spaced members of each of the studs and adapted to interlock in the recess or depression of the pivot member of the supplemental bow adjacent thereto.

2. In eyeglasses or spectacles, the combination of a main frame comprising bows, studs projected from the bows and comprising spaced members, supplemental bows provided with pivot members projected therefrom and pivoted between the spaced members of the studs aforesaid, and projections extended from the studs aforesaid and interlocking with the pivot members of the supplemental bows to hold said supplemental bows in an ascertained position.

In testimony whereof I affix my signature in presence of two witnesses.

JOHN W. J. WELLS. [L. S.]

Witnesses:
J. N. LISENBY,
C. G. STOKER.